(12) United States Patent
Yamada et al.

(10) Patent No.: US 7,280,131 B2
(45) Date of Patent: Oct. 9, 2007

(54) IMAGE FORMATION DEVICE

(75) Inventors: Naoto Yamada, Abiko (JP); Hajime Kaji, Abiko (JP); Yoshitaka Yamazaki, Okegawa (JP); Junichi Noguchi, Toride (JP); Takayuki Kawakami, Nagoya (JP); Hajime Motoyama, Moriya (JP); Satoshi Ogawara, Abiko (JP); Yushi Oka, Abiko (JP); Akihito Mori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/612,926

(22) Filed: Dec. 19, 2006

(65) Prior Publication Data

US 2007/0097203 A1    May 3, 2007

Related U.S. Application Data

(63) Continuation of application No. 11/003,180, filed on Dec. 3, 2004, now Pat. No. 7,170,543.

(30) Foreign Application Priority Data

Dec. 5, 2003   (JP) .............................. 2003-408071
Nov. 17, 2004  (JP) .............................. 2004-333196

(51) Int. Cl.
    *B41J 2/47*    (2006.01)

(52) U.S. Cl. ...................................... 347/247; 347/237
(58) Field of Classification Search ................ 347/237, 347/247; 399/44
    See application file for complete search history.

(56) References Cited

U.S. PATENT DOCUMENTS

| 5,398,101 A | * | 3/1995 | Takada et al. ................. 399/43 |
| 7,062,217 B2 | * | 6/2006 | Tsukamoto et al. ......... 399/401 |
| 7,170,543 B2 | * | 1/2007 | Yamada et al. ............. 347/237 |
| 2003/0043256 A1 | * | 3/2003 | Conrow et al. ............. 347/248 |

FOREIGN PATENT DOCUMENTS

| JP | 04-288560 | | 10/1992 |
| JP | 10-149057 | | 6/1998 |
| JP | 2003202789 A | * | 7/2003 |

* cited by examiner

*Primary Examiner*—Huan Tran
(74) *Attorney, Agent, or Firm*—Canon U.S.A. Inc I.P. Div

(57) ABSTRACT

An image formation device changes the rotational rate of a polygon motor, i.e. the main-scanning rate, and selects one of pulse width conversion tables when an image formation is performed multiple times on a single sheet of transfer paper. The changing of the main-scanning rate is for preventing inconsistent sizes between a first recorded image and a second recorded image caused by shrinkage of transfer paper. The pulse width conversion tables allow the pulse widths to be modulated.

4 Claims, 9 Drawing Sheets

PWM CONVERSION TABLE

H1
PULSE-WIDTH
OF LASER

PULSE-WIDTH CONVERSION RULE (y1)

IMAGE DATA (VD)

PWM CONVERSION TABLE

H2
PULSE-WIDTH
OF LASER

PULSE-WIDTH CONVERSION RULE (y2)

IMAGE FORMATION DEVICE

CROSS-REFERENCE TO RELATED APPLICATIONS

This application is a continuation of application Ser. No. 11/003,180 filed Dec. 3, 2004, now U.S. Pat. No. 7,170,543, which claims priority from Japanese Patent Application Nos. 2003-408071 filed Dec. 5, 2003 and 2004-333196 filed Nov. 17, 2004, all of which are hereby incorporated by reference herein in their entirety.

BACKGROUND OF THE INVENTION

1. Field of the Invention

The present invention relates generally to electro-photographic image formation methods and devices such as digital copiers and laser beam printers, and particularly, to an image formation method and device which generates a pulse signal based on image data so as to form an electrostatic latent image on a photosensitive element.

2. Description of the Related Art

In a typical image formation device using an electro-photographic technique, a transferred toner image is fixed onto a sheet of transfer paper in order to form a permanent image on the paper. The toner image is usually fixed onto the transfer paper using thermal fixing. Various types of thermal-fixing techniques include hot air fixing, oven fixing, and more recently, heating roller fixing. In the heating-roller technique, a heating roller and a pressure roller are disposed in parallel to each other in the conveying path of the transfer paper, and the transfer paper is conveyed through the two rollers while being nipped therebetween. The heating roller fuses the toner, and at the same time, the pressure roller presses the fused toner against the transfer paper so as to fix the toner on the transfer paper. As an alternative to such a structure, a pressure pad or a pressure belt is provided in place of the pressure roller.

However, when using such a thermal-fixing technique to fix the toner image on the transfer paper, the heat causes the moisture in the transfer paper to evaporate and thus causes the transfer paper to shrink. The degree of shrinkage may vary depending on, for example, the material of the transfer paper or the thickness of the paper. Furthermore, it is generally known from experience that it normally takes about 15 to 20 minutes for the shrunken transfer paper to recover its original size.

To perform double-sided recording on the transfer paper, a thermal-fixing unit provided in the image formation device fixes a first toner image onto a first side of the transfer paper, and then the transfer paper is turned over so that a second toner image can be transferred to a second side of the transfer paper. Subsequently, the thermal-fixing unit fixes the second toner image on the second side of the transfer paper. On the other hand, to combine two images on a single side of the transfer paper, the thermal-fixing unit fixes a first toner image onto one side of the transfer paper, and then, without turning over the transfer paper, a second toner image is transferred to the same side of the paper. Subsequently, the thermal-fixing unit fixes the second toner image onto the paper.

In both cases, the first formed image and the second formed image are different in size because the transfer paper becomes smaller due to shrinkage after the first image is formed.

Japanese Patent Laid-Open No. 4-288560, for example, discloses a technique for solving such a problem. Specifically, an optical sensor is disposed upstream of a position where the transferring process is performed in a conveying path of the transfer paper so as to detect the longitudinal size and the lateral size of the transfer paper. Moreover, another optical sensor is disposed downstream of a thermal-fixing unit so as to similarly detect the longitudinal size and the lateral size of the transfer paper. Based on these detections, the shrinkage or expansion proportion (i.e., change or ratio of the size before thermal fixing relative to the size after thermal fixing) of the transfer paper in both the longitudinal and lateral directions is determined. Based on the determined shrinkage or expansion proportion, the scanning rate of an optical scanner is controlled.

Japanese Laid-Open No. 10-149057 discloses a technique for reducing the workload required in the above-mentioned technique. Specifically, an optical sensor is disposed upstream of a position where the transferring process is performed in the conveying path of the transfer paper so as to detect the longitudinal size of a first sheet of transfer paper before or after the fixing process is performed. Based on the detection, the shrinkage or expansion proportion in the longitudinal direction of the first sheet of transfer paper is determined. Accordingly, the scanning rate of an optical scanner is controlled for the second sheet of transfer paper onward using the shrinkage or expansion proportion of the first sheet of transfer paper.

Image forming devices also use known modulation techniques to record images based on multiple-value image data for each pixel. One modulation technique is known as Pulse Width Modulation (PWM). In PWM, the width of a pulse representing the light-emission time of a laser beam is modulated for each pixel, while maintaining the intensity of the laser beam. Another one is a technique in which the intensity of a laser beam is modulated while maintaining the light-emission time for each pixel. PWM is more commonly used since it provides a simpler control operation and more stable recording.

To prevent different sizes of formed images due to shrinkage of the transfer paper, an image formation device that uses PWM not only changes the scanning rate of the optical scanner based on the shrinkage or expansion proportion of the transfer paper, but also changes the main-scanning rate (i.e. the rotational rate of a polygon motor) of a laser beam and the sub-scanning rate (i.e. the rotational rate of a photosensitive element) of a laser beam with respect to the photosensitive element.

However, when the main-scanning rate of the laser beam is changed, the density level of each electrostatic latent image segment formed on the photosensitive element also changes. This is because the light-emission time is modulated for each pixel without changing the intensity of the emitted laser beam in the PWM technique, and therefore, when the main-scanning rate is changed, the amount of incident laser beam per unit area on the photosensitive element changes even if the recording processes are performed based on the same image data having the same density levels.

For example, when forming electrostatic latent image segments based on image data items having the same density level at a regular interval, if the main-scanning rate of the laser beam is lowered, the interval of the electrostatic latent image segments becomes small, thus causing the area of each latent image segment to become smaller. In such a case, if the pulse signal, i.e. pulse width, is not changed, the light-emission time of the laser beam, namely, the amount of incident laser beam, remains the same, meaning that the same amount of laser beam is emitted to the smaller area of each latent image segment, and therefore, the amount of incident laser beam per unit area on the entire latent image is increased. As a result, the density level of the entire electrostatic latent image is increased.

SUMMARY OF THE INVENTION

The present invention is directed to an image formation device capable of resolving one or more disadvantages of conventional image formation devices. Thus, one advantage of the present invention is that an image formation device is disclosed that can prevent inconsistent image sizes from being formed due to shrinkage or expansion of transfer paper when multiple images are formed on a single transfer paper.

According to a first aspect of the present invention, an image formation device is provided. Such an image formation device performs an image formation process by generating a pulse signal corresponding to image data; turning on/off a laser beam emitted towards a photosensitive element based on the pulse signal so as to form an electrostatic latent image on the photosensitive element; developing the electrostatic latent image; transferring the latent image to transfer paper; and fixing the transferred image on the transfer paper. The image formation device includes an obtainer for obtaining shrinkage or expansion information of the transfer paper before or after the image is fixed onto the transfer paper; a changer for changing a scanning rate of the laser beam based on the shrinkage or expansion information obtained by the obtainer if the image formation process is to be performed again on the same paper already having the image fixed thereon; and a converter for changing a pulse width for each pixel of the image data based on the scanning rate changed by the changer when the pulse signal corresponding to the image data is generated.

According to a second aspect of the present invention, an image formation device is provided, which performs an image formation process by generating a pulse signal corresponding to image data; turning on/off a laser beam emitted towards a photosensitive element based on the pulse signal so as to form an electrostatic latent image on the photosensitive element; developing the electrostatic latent image; transferring the latent image to transfer paper; and fixing the transferred image on the transfer paper. The image formation device of the second aspect includes a changer for changing a scanning rate of the laser beam emitted towards the photosensitive element when the image formation process is to be performed on both faces of the same transfer paper such that a first latent-image formation process for a front face of the transfer paper and a second latent-image formation process for a back face of the transfer paper are to be performed at different scanning rates; and a converter for changing an intensity of the laser beam based on the scanning rate changed by the changer such that the intensity of the laser beam emitted towards the front face is different from the intensity of the laser beam emitted towards the back face.

According to these structures, even if the main-scanning rate is changed in order to prevent inconsistent sizes of formed images, such an image formation device can compensate for the difference in the density level of the subsequent image, which may be caused by the change in the main-scanning rate.

The above and other features, and advantages of the present invention will become more apparent from the following detailed description taken in conjunction with the accompanying drawings.

DETAILED DESCRIPTION OF THE EMBODIMENTS

Figure 1:
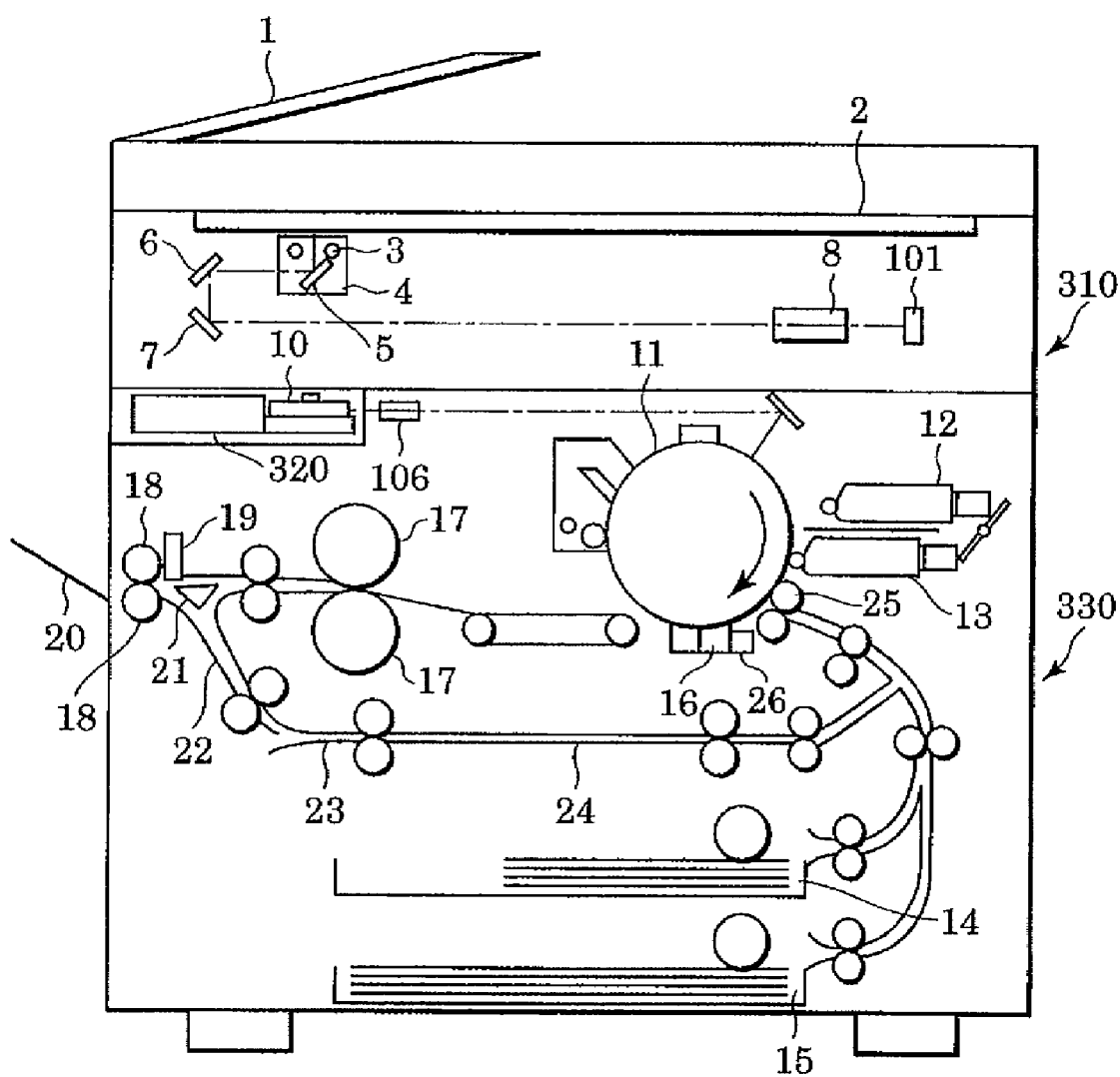
FIG. 1 is a cross-sectional view of an electro-photographic digital copier according to a first embodiment of the present invention.

The present invention will now be described below with reference to the accompanying drawings showing an embodiment thereof. In the drawings, elements and parts which are identical throughout the views are designated by identical reference numerals, and duplicate description thereof is omitted.

FIG. 1 is a cross-sectional view of an electro-photographic digital copier according to a first embodiment of the present invention. Operation of the digital copier will also be described with reference to FIG. 3, which illustrates an image formation process from a photo-electric conversion step to a latent-image formation step performed by the digital copier.

Figure 3:
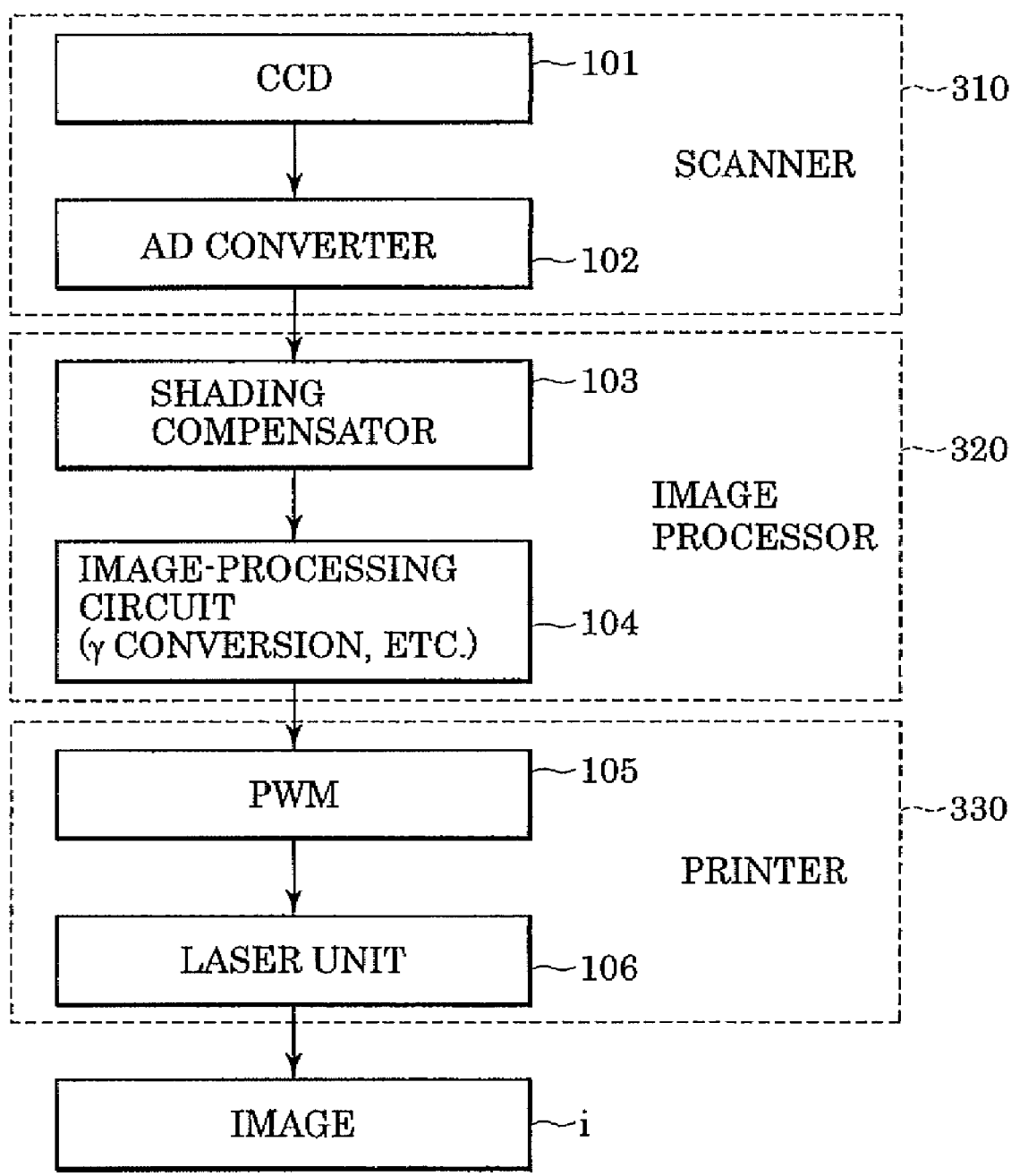
FIG. 3 illustrates an image formation process from a photo-electric conversion step to a latent-image formation step according to the first embodiment.

Among other components, the digital copier according to the present embodiment includes a scanner 310 and a printer 330. The scanner 310 includes a document feeder 1 which feeds original documents disposed thereon one by one to a glass base 2. Moreover, the scanner 310 further includes a scanner unit 4 which contains a lamp 3 and a scanning mirror 5. While the lamp 3 is turned on, the scanner unit 4 is capable of moving back and forth in the horizontal direction in FIG. 1 so as to photoscan an image of each document disposed on the glass base 2. In this case, the light reflected from the document, i.e. image light, travels through scanning mirrors 5, 6, and 7 and is focused by a lens 8. Referring to FIG. 3, the image light is then input to an image sensor 101. The image sensor 101 performs photo-electric conversion on the input image light and outputs an analog image signal corresponding to the image light. The analog image signal is then converted to a digital signal by an AD converter 102, and the digital signal is output to an image processor 320 as image data indicating the density levels.

The image processor 320 includes a shading compensator 103 which compensates for read errors by the scanner 310 with respect to the image data input from the AD converter 102. Moreover, the image processor 320 further includes an image-processing circuit 104 which performs image processing, such as γ conversion, on the image data. Subsequently, referring to FIG. 1, the image data is input to a photo-control unit 10 in the printer 330 as multiple-value image data indicating multiple gray-scale levels.

Referring to FIGS. 1 and 3, the photo-control unit 10 converts the image data input from the image processor 320 to a pulse signal via a pulse width modulator (PWM) 105. The pulse signal is then sent to a semiconductor laser unit 106, specifically, a laser driver 114 shown in FIG. 5, where a laser beam to be emitted towards a photosensitive element 11 is turned on and off. When the laser beam enters the photosensitive element 11, an electrostatic latent image i is formed on the photosensitive element 11. Developer units 12 and 13 then develop the electrostatic latent image i into a toner image having predetermined colors.

In synchronization with the formation of the electrostatic latent image i, a sheet of transfer paper is picked up from one of sheet trays 14 and 15, and is conveyed to a transfer/separator unit 16 via a registration roller 25. The transfer/separator unit 16 transfers the toner image on the photosensitive element 11 to the transfer paper. The transfer paper having the toner image thereon is released from the photosensitive element 11 by the transfer/separator unit 16 and is delivered to a thermal-fixing unit 17 where the toner image is fixed onto the transfer paper. Generally, the transfer paper is then conveyed through discharge rollers 18 so as to be discharged to a collection tray 20.

For double-sided recording, after the transfer paper advances past a discharge sensor 19, the discharge rollers 18 are rotated in a direction opposite to the discharge direction and a flapper 21 is shifted upward. Thus, the transfer paper having a first toner image fixed thereon is conveyed through conveying paths 22 and 23 and is delivered to an intermediate tray 24 in a state where the transfer paper is not turned over. The transfer paper is then conveyed from the intermediate tray 24 to the transfer/separator unit 16 during which process the transfer paper is turned over. Thus, a second toner image is transferred to the reverse surface of the transfer paper.

On the other hand, for multilayer recording, the flapper 21 is lifted upward before the transfer paper reaches the discharge sensor 19. Thus, the transfer paper having a first toner image fixed thereon is conveyed through the conveying paths 22 and 23 and is delivered to the intermediate tray 24 in a state where the transfer paper is turned over. The transfer paper in the intermediate tray 24 is then conveyed to the transfer/separator unit 16, during which process, the transfer paper is turned over again. Thus, a second toner image is transferred to the same surface of the transfer paper having the first toner image thereon such that the second toner image is disposed over the first toner image in a multilayer manner.

An optical sensor 26 is disposed upstream of the photosensitive element 11 so as to measure the longitudinal size of the transfer paper, namely, the length of the paper in the sub-scanning direction. The optical sensor 26 is further described with reference to FIG. 5.

Figure 2:
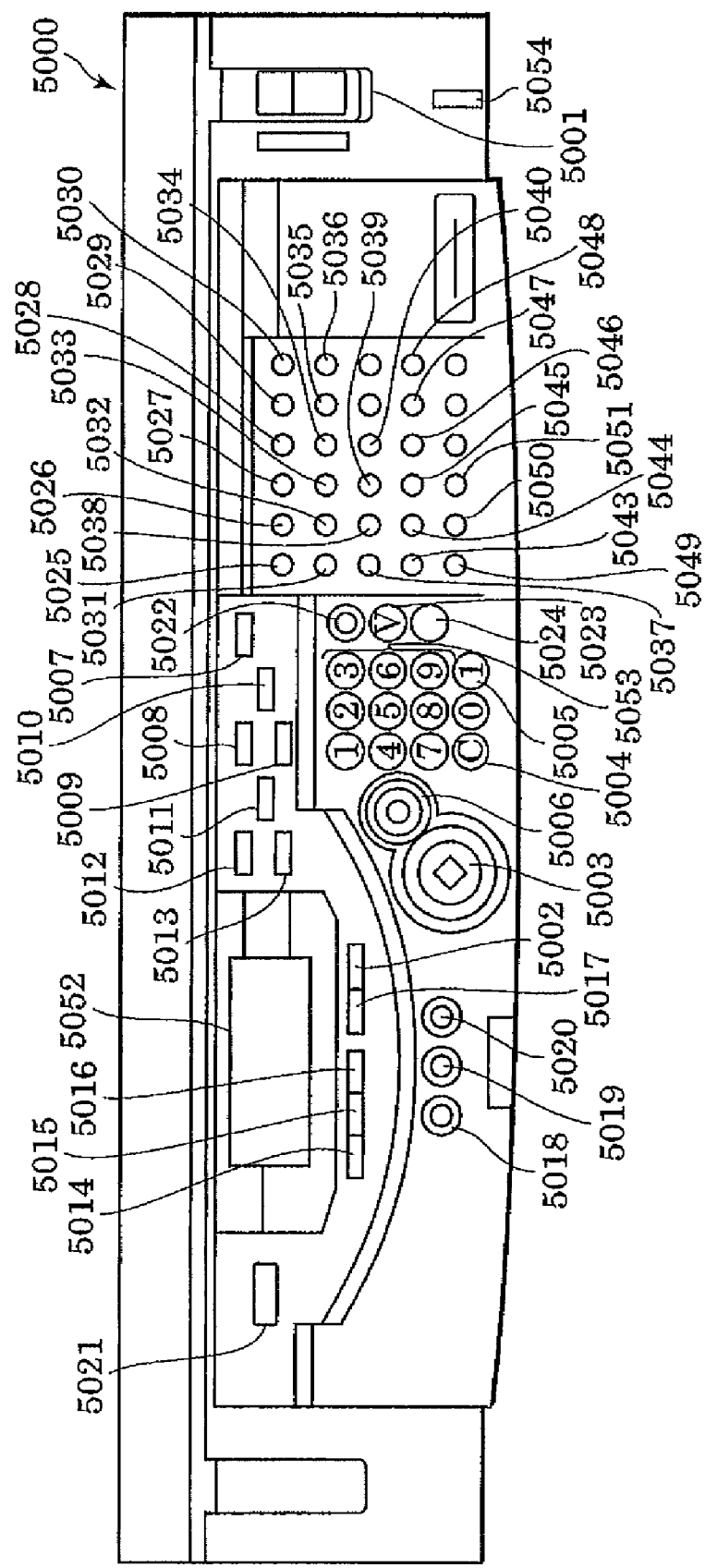
FIG. 2 is a top view of an operating panel provided in the electro-photographic digital copier according to the first embodiment.

FIG. 2 is a top view of an operating panel 5000 provided in the digital copier shown in FIG. 1.

Referring to FIG. 2, the operating panel 5000 includes a power switch 5001 for turning the digital copier on and off; a reset key 5002 for resetting each mode to a standard mode during a stand-by state; a start key 5003 for starting a copy operation; and a clear key 5004 for deleting preset values.

The operating panel 5000 further includes an ID key 5005 which allows copy operation for only a certain operator and restricts the use for other operators unless a proper identification code is input; a stop key 5006 for pausing or aborting a copy operation; a help key 5007 used when checking the content of each function; up and down cursor keys 5008 and 5009 for moving the cursor upward or downward in each function setup screen; and left and right cursor keys 5011 and 5010 for moving the cursor left or right in each setup screen.

Furthermore, the operating panel 5000 further includes an OK key 5012 for determining the content displayed on each function setup screen on a display 5052; an enter key 5013 for performing the content displayed at the lower right corner of each function setup screen on the display 5052; a reduce key 5014 for changing the current unit size to a smaller unit size; a direct key 5015 for direct copying; and an enlarge key 5016 for changing the current unit size to a larger unit size.

Moreover, the operating panel 5000 further includes a tray selection key 5017 for selecting one of the trays containing the transfer paper for the copy operation; a first density selection key 5018 for reducing the copy-density level; an AE key 5019 for automatic adjustment of the copy-density level with respect to the density level of the original document; a second density selection key 5020 for raising the copy-density level; and a sort key 5021 for selecting an operation mode for a sorting function.

The operating panel 5000 further includes a preheat key 5022; a cut-in key 5023 for performing interruption-copying; numerical keys 5024 for numerical inputs; and a marker key 5025 for selecting a trimming operation, a masking operation, or a partial-treatment operation, such as contouring, screening, shading, or a negative-positive operation. The operating panel 5000 further includes a paper-type input key 5026 for inputting the type of paper contained in each tray (i.e. paper material, thin paper, plain paper, thick paper); a color-delete key 5027 for deleting a certain color; a picture-quality key 5028 for setting the picture quality; a negative-positive key 5029 used when a negative-positive operation is performed; an image-create key 5030 which is pressed when performing contouring, screening, shading, italicizing, image mirroring, or image repeating; and a trimming key 5031 for selecting a certain area in an image so as to trim the selected area.

The operating panel 5000 further includes a masking key 5032 for selecting a certain area in an image so as to mask the selected area; and a partial-treatment key 5033 for selecting a certain area of an image and performing a partial treatment operation, such as contouring, screening, shading, or a negative-positive operation, on the selected area. The operating panel 5000 also includes a binding key 5035 for creating a binding margin on one side of the paper; a frame-erase key 5034 for erasing the current frame based on a selected mode such as a sheet-frame erasing mode in which a new frame is made based on the sheet-size, a document-frame erasing mode in which a new frame is made based on the size of the original document, and a book-frame erasing mode in which a new frame is made and a blank space is added in the central portion based on the size of the double-spread opened pages of a book. Note that the size of the new frame is selectable.

The operating panel 5000 further includes a shift key 5036 for shifting the position of an image to be formed with respect to the transfer paper. In detail, the position of an image can be shifted in the upward, downward, left, and right directions, towards the center of the paper, towards one of the corners of the paper, or to a selected position on the paper. Furthermore, a zoom key 5037 is provided for setting the magnification of the copying image by a unit of 1% in a range of 25% to 400%. Moreover, such magnification can be set individually for both main-scanning and sub-scanning directions. The operating panel 5000 further includes an auto-magnification key 5038 which automatically enlarges or reduces the size of the image to be formed based on the size of the transfer paper. Moreover, such an automatic magnification can be set individually for both the main-scanning and the sub-scanning directions.

Furthermore, a multi-page enlargement key 5039 is provided for enlarging an image of a single original document and then copying the image to multiple sheets of transfer paper. A reduce-layout key 5040 is provided for reducing images of multiple sheets of original documents and then copying the reduced images to a single sheet of transfer paper. The operating panel 5000 is further provided with a multi-page key 5043 for dividing the copy region on the glass base 2 into two halves and automatically copying images of two sheets of original documents in a continuous manner (continuous multi-page copying, continuous double-sided copying).

The operating panel 5000 further includes a double-side key 5044 for performing double-sided recording on a single sheet of transfer paper (single-side to double-side (original to copy), multi-page to double-side (original to copy), double-side to double-side). A multilayer key 5045 is provided for recording images of multiple sheets of original documents onto a single side of transfer paper in a multi-layered manner (multilayer copy, multi-page multilayer copy). The operating panel 5000 further includes an MC key 5046 which is pressed when using a memory card; a projector key 5047 which is pressed when using a projector; and a printer key 5048 for setting modes when using the printer.

Also included on the operating panel 5000 is a mixed-document-size key 5050 used when various sizes of documents are mixed in the document feeder 1; a mode-memory key 5051 for storing various types of copy modes or for reading and setting one of the stored copy modes. The display 5052 displays the selected mode of the copier, the number of sheets to be copied, the magnification of the copying image, and the selected size of the transfer paper. Moreover, when the copy mode is being set, the display 5052 displays the content of the mode being set.

The operating panel 5000 further includes a system pre-heat key 5053 for turning a system preheat mode either on or off. Specifically, during the system preheat mode, a control unit for the copy operation is shut off while only the external interface and its peripheral circuit is in operation. The operating panel 5000 includes a power display portion 5054 which is lit when the power switch 5001 is turned on and which is turned off when the power switch 5001 is off.

Figure 4:
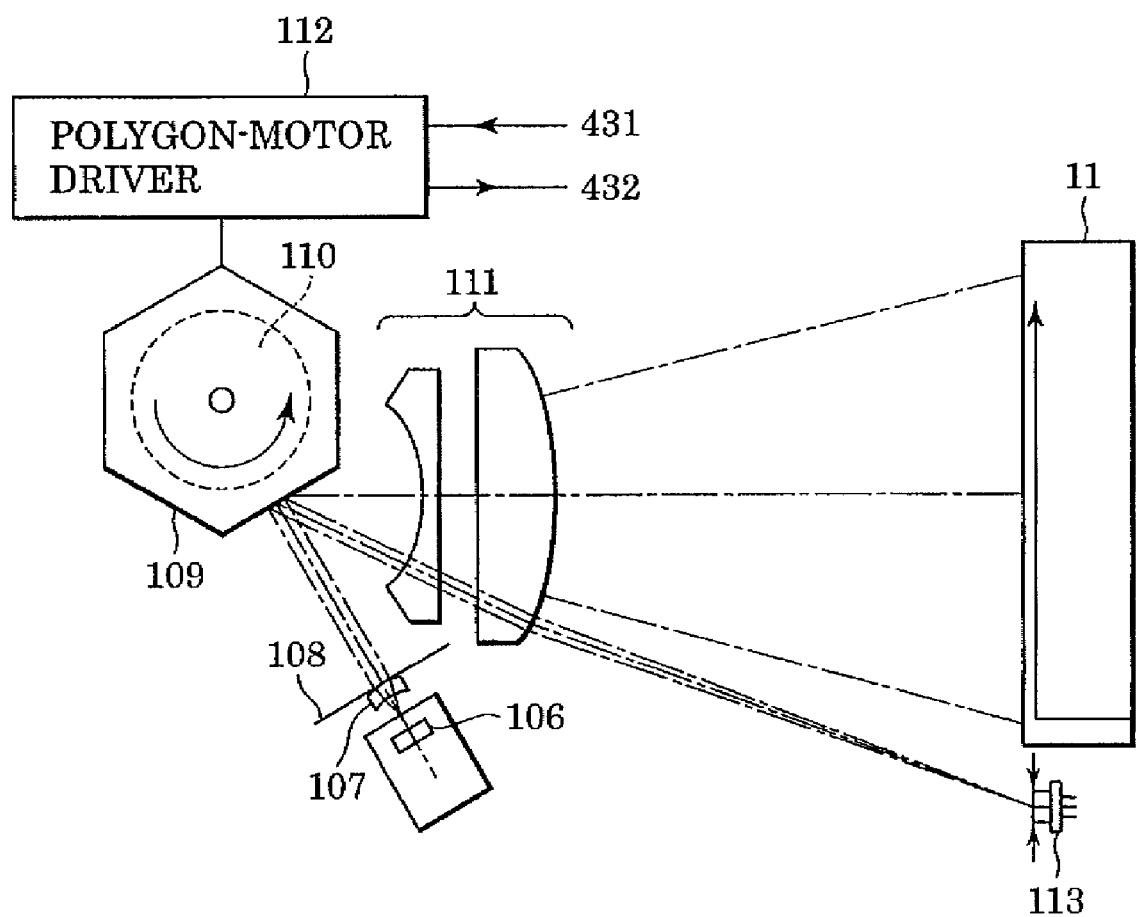
FIG. 4 illustrates the mechanical structure of a photo-control unit according to the first embodiment.

FIG. 4 illustrates the mechanical structure of the photo-control unit 10. In FIG. 4, a laser beam emitted from the semiconductor laser unit 106 is substantially collimated by a collimator lens 107 and an aperture 108. The collimated beam having a predetermined beam diameter then enters a rotatable polygon mirror 109. The polygon mirror 109 is rotated by a polygon motor 110 in a direction indicated by an arrow in FIG. 4 at an equiangular rate. Based on the rotation of the polygon mirror 109, the laser beam incident on the polygon mirror 109 is deflected such that the traveling direction of the laser beam changes at an equiangular rate. The deflected laser beam enters the photosensitive element 11 via an f-θ lens unit 111 and is photoscanned across the photosensitive element 11. In this case, the f-θ lens unit 111 compensates for changes in the main-scanning rate caused by the differences in the optical distance of the laser beam deflected by the polygon mirror 109 to the photosensitive element 11 so that the main-scanning rate can be set constant.

A polygon-motor driver 112 controls the rotational rate of the polygon motor 110 based on a rate-switching signal 431, that is, a target scanning-rate signal, input from a CPU 117, which will be further described below with reference to FIG. 5. When the rotational rate of the polygon motor 110 reaches the target scanning-rate, the polygon-motor driver 112 outputs a rate-maintaining signal 432 to the CPU 117. Alternatively, instead of outputting the target scanning-rate signal to the polygon-motor driver 112, the CPU 117 may directly output a rate-adjustment value corresponding to the standard rotational rate.

A beam detector 113 is provided for detecting laser beams from the polygon mirror 109. When a laser beam is detected by the beam detector 113 and after a predetermined time period from the detection, the PWM-converted laser beam corresponding to the image data is photoscanned in the main-scanning direction.

Figure 5:
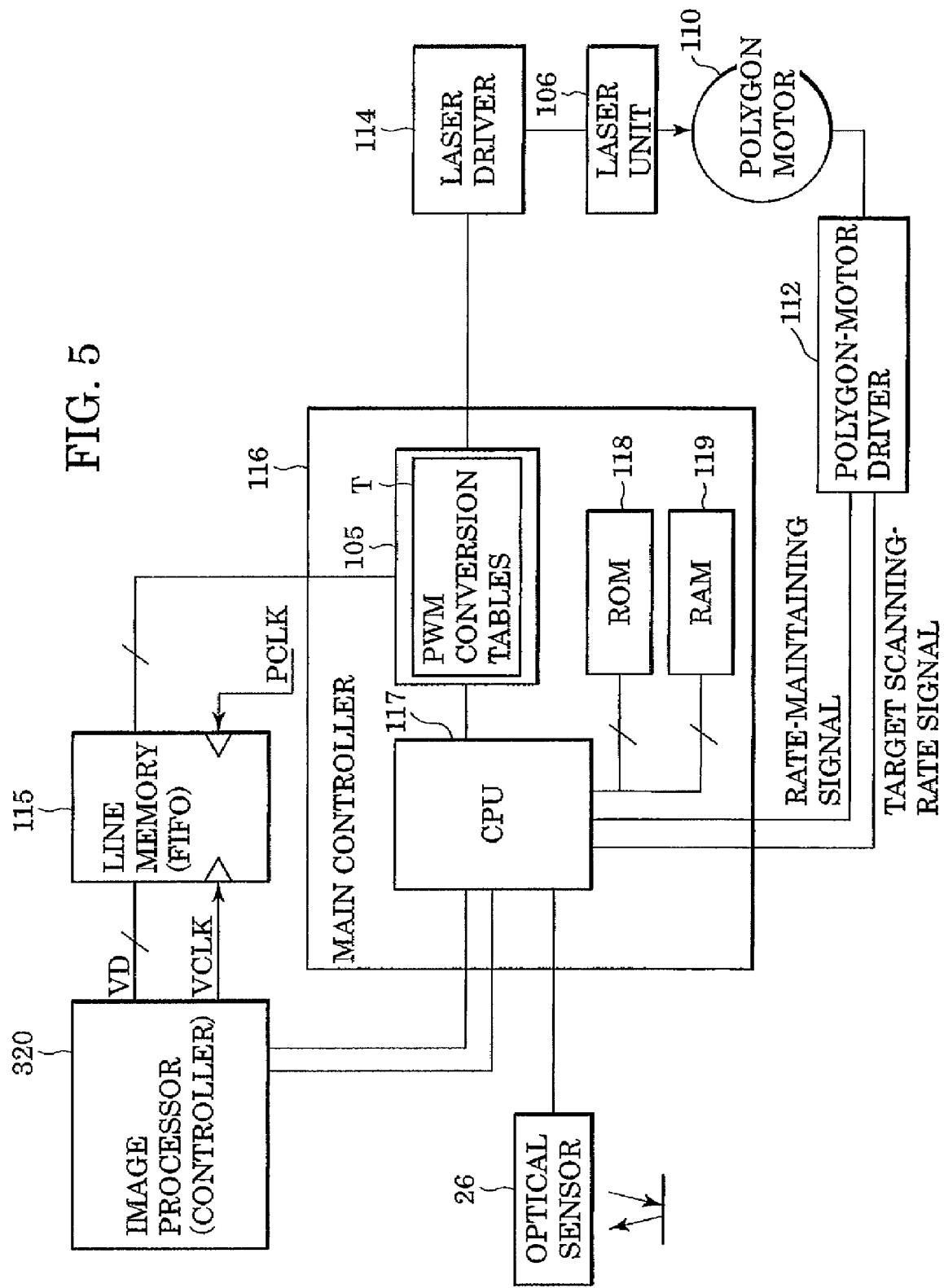
FIG. 5 is a block diagram illustrating the electrical structure of the photo-control unit according to the first embodiment.

FIG. 5 is a block diagram illustrating an electrical structure of the photo-control unit 10.

In FIG. 5, the image data of one main scanning line processed by the image processor 320, as described above, is stored in a line memory 115 and is then supplied to the PWM 105 in a main controller 116. The PWM 105 contains a plurality of PWM conversion tables T. Each of the PWM conversion tables T stores pulse widths corresponding to multiple values included in image data, the multiple values corresponding to multiple gray-scale levels. Moreover, the pulse width for a pixel corresponding to one image data item (i.e. density value) in one PWM conversion table T is different from that of another PWM conversion table T. Furthermore, the PWM conversion tables T are provided in a non-volatile memory portion of the main controller 116.

Based on the main-scanning rate, that is, the rotational rate of the polygon motor 110, the CPU 117 selects one of the PWM conversion tables T. The process for such a selection for the PWM conversion tables T will be described later in detail. The CPU 117 sends a command signal to the PWM 105 so as to convert the image data to a PWM signal based on the selected PWM conversion table T. Then, based on the PWM signal output from the PWM 105, the laser driver 114 turns on and off the laser beam emitted from the semiconductor laser unit 106.

Furthermore, based on a signal from the optical sensor 26, the CPU 117 determines the shrinkage or expansion proportion of transfer paper in a case where double-sided recording or multilayer recording is to be performed. Based on the determined shrinkage or expansion proportion, the CPU 117 controls the polygon-motor driver 112 to change the rotational rate of the polygon motor 110. Then, based on the changed rotational rate, the CPU 117 selects an appropriate table from the PWM conversion tables T. To run this operation, the CPU 117 implements a control program included in a ROM 118 while utilizing a RAM 119 as a work space.

The operation for changing the rotational rate of the polygon motor 110 and the operation for selecting one of the PWM conversion tables T will now be described.

After advancing through the thermal-fixing unit 17, a transfer paper has shrunk due to water evaporation. The shrinkage proportion of the transfer paper is detected by the optical sensor 26. In detail, the optical sensor 26 disposed upstream of the photosensitive element 11 is provided with a light emitter and a photo-acceptor. The CPU 117 measures the time period between a point in which light is emitted from the light emitter and a point in which the light reflected from the transfer paper is received by the photo-acceptor. The CPU 117 then calculates the product of the measured time period value multiplied by the conveying rate value of the transfer paper so as to determine the longitudinal size of the transfer paper, namely, the length of the paper in the sub-scanning direction.

Subsequently, in double-sided recording or multilayer recording, the CPU 117 measures the longitudinal size L1 of the transfer paper before the first recording process, and moreover, the CPU 117 measures the longitudinal size L2 of the transfer paper between the end of the first recording process and the start of the second recording process so as to calculate the ratio of L2 to L1. Thus, a shrinkage proportion (ratio or change) ΔL in the longitudinal direction of the transfer paper is determined. Although the transfer paper may shrink both in the longitudinal and lateral directions, the shrinkage proportion is considered to be substantially equivalent in the two directions. Therefore, in the first embodiment, to simplify the structure and the control operation, the shrinkage or expansion proportion in the lateral direction is the same as the shrinkage or expansion proportion ΔL in the longitudinal direction.

Accordingly, since the size of the transfer paper is different between the first recording process and the second recording process due to shrinkage or expansion, if the rotational rate of the polygon motor 110, i.e. the main-scanning rate, and the rotational rate of the photosensitive element 11, i.e. the sub-scanning rate, are not to be changed, the size of the first recorded image and the size of the second recorded image will be different. Consequently, based on the shrinkage or expansion proportion ΔL in the lateral direction of the transfer paper, the CPU 117 calculates a main-scanning rate value that compensates for the change in the lateral size of the recorded image. Thus, the rotational rate of the polygon motor 110 is switched to the calculated main-scanning rate according to which main-scanning is performed during the second recording process. Moreover, based on the shrinkage or expansion proportion ΔL in the longitudinal direction of the transfer paper, the CPU 117 also calculates a sub-scanning rate value that compensates for the change in the longitudinal size of the recorded image. Thus, the rotational rate of a motor (not shown) for rotating the photosensitive element 11 is switched to the calculated sub-scanning rate according to which sub-scanning is performed during the second recording process.

The light-emission time is modulated by using PWM for each pixel without changing the intensity of the emitted laser beam. For this reason, when the main-scanning rate is switched, as described above, the amount of incident laser beam per unit area on the photosensitive element 11 changes even if the recording processes are performed based on the same image data having the same density levels. Consequently, this results in different density levels of the images formed.

Figure 6:
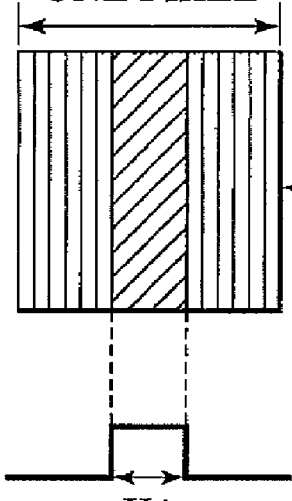
FIG. 6 illustrates the switching process of PWM conversion tables according to the first embodiment.
Figure 6:
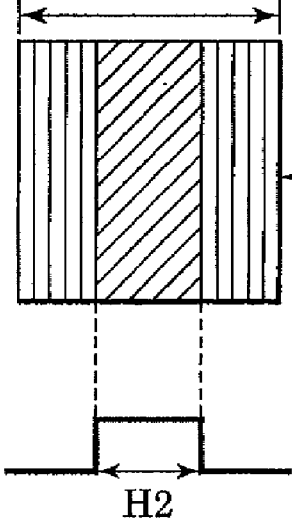

For example, if an image is to be formed on a sheet of shrunken transfer paper and the main-scanning rate of the laser beam is lowered so as to prevent the image from being over-sized, the density level of the image increases. As shown in the upper section of FIG. 6, to prevent such a density level increase, the CPU 117 selects a PWM conversion table T that is based on a pulse width conversion rule γ1. In detail, with respect to image data having a predetermined density level, such a pulse width conversion rule γ1 allows the pulse width to be narrower for every pixel. In contrast, if an image is to be formed on a sheet of expanded transfer paper and the main-scanning rate of the laser beam is increased so as to prevent the image from being under-sized, the density level of the image decreases. As shown in the lower section of FIG. 6, to prevent such a density level decrease, the CPU 117 selects a PWM conversion table T that is based on a pulse width conversion rule γ2. In detail, with respect to image data having a predetermined density level, such a pulse width conversion rule γ2 allows the pulse width to be wider for every pixel.

To switch the rotational rate of the polygon motor 110, i.e. the main-scanning rate, in a multilevel manner, the number of PWM conversion tables T, i.e. the number of the rules, may be increased. Furthermore, for continuously performing double-sided recording or multilayer recording on multiple sheets of transfer paper of the same paper type, the shrinkage or expansion proportion calculated for the first sheet of transfer paper may be used for the second and additional transfer papers. This can reduce the workload on the CPU 117. This concept applies to a second embodiment of the present invention, which will be described later.

According to the first embodiment, when image formation is to be performed multiple times on a sheet of transfer paper having an image fixed thereon, the rotational rate of the polygon motor 110, i.e. the main-scanning rate, is switched so as to prevent inconsistent sizes of the formed images due to shrinkage or expansion of the transfer paper. Moreover, an appropriate PWM conversion table T is selected for performing a pulse width conversion that compensates for the difference in density levels between the images caused by the switching of the main-scanning rate. Accordingly, this prevents inconsistent density levels of images and thus allows high-quality images to be formed.

Figure 7:
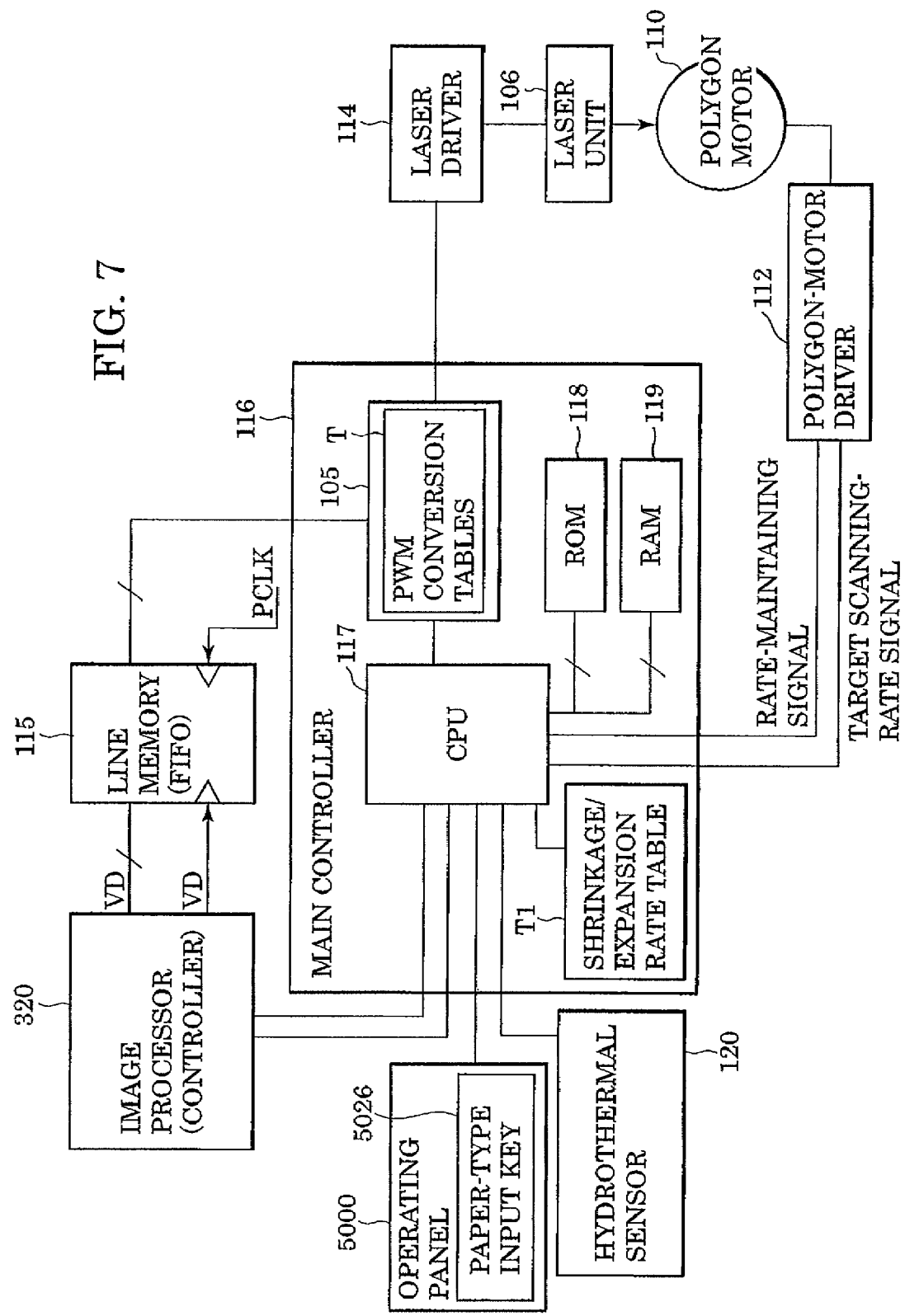
FIG. 7 is a block diagram illustrating the electrical structure of a photo-control unit according to a second embodiment of the present invention.

Referring to FIG. 7, a second embodiment of the present invention will now be described. The second embodiment takes a different approach in detecting the shrinkage/expansion proportion of the transfer paper, as shown in FIG. 7.

According to the second embodiment, the operating panel 5000 is provided with the paper-type input key 5026 for inputting the type of transfer paper used, i.e. paper material, thin paper, plain paper, thick paper. Furthermore, the digital copier contains a hygrothermal sensor 120 for detecting the temperature and the humidity. Moreover, the nonvolatile memory portion of the main controller 116 includes a shrinkage or expansion proportion table T1 in which shrinkage or expansion proportion values are stored. Specifically, such shrinkage or expansion proportion values are values of transfer paper per unit length just before or after passing through the thermal-fixing unit 17, and are classified according to different paper types, temperatures, and humidity levels while assuming that the shrinkage or expansion proportion is the same in both the longitudinal and lateral directions.

According to such a structure, based on the paper type input via the paper-type input key 5026 and the temperature and humidity detected by the hygrothermal sensor 120, the CPU 117 selects a corresponding shrinkage or expansion proportion value of transfer paper per unit length from the shrinkage or expansion proportion table T1. Thus, similar to the first embodiment, the CPU 117 changes the rotational rate of the polygon motor 110, i.e. the main-scanning rate, based on the selected shrinkage or expansion proportion value so as to prevent inconsistent sizes between the first recorded image and the second recorded image onward which may be caused by shrinkage or expansion of the transfer paper. Moreover, the CPU 117 selects an appropriate PWM conversion table T for performing a pulse width conversion that compensates for the difference in density levels between the images caused by the switching of the main-scanning rate.

If the shrinkage or expansion proportion is different for the longitudinal and lateral directions, the shrinkage or expansion proportion values in the shrinkage or expansion proportion table T1 may be stored according to different paper types, temperatures, humidity levels, and directions (i.e. the longitudinal and lateral directions).

Consequently, in the second embodiment, an appropriate shrinkage or expansion proportion value is simply selected from a table and is not determined based on calculation. This reduces the workload on the CPU 117 while still achieving the same effect as the first embodiment.

As described above, in the first and second embodiments, the inconsistent density levels of images are corrected by selecting an appropriate PWM conversion table corresponding to a change in the rotational rate of the polygon motor 110 (main-scanning rate), which is based on the shrinkage or expansion proportion of the transfer paper. On the other hand, referring to FIGS. 8 to 10B, according to a third embodiment of the present invention, an intensity of a laser beam is directly changed in order to correct the inconsistent density levels.

Figure 8:
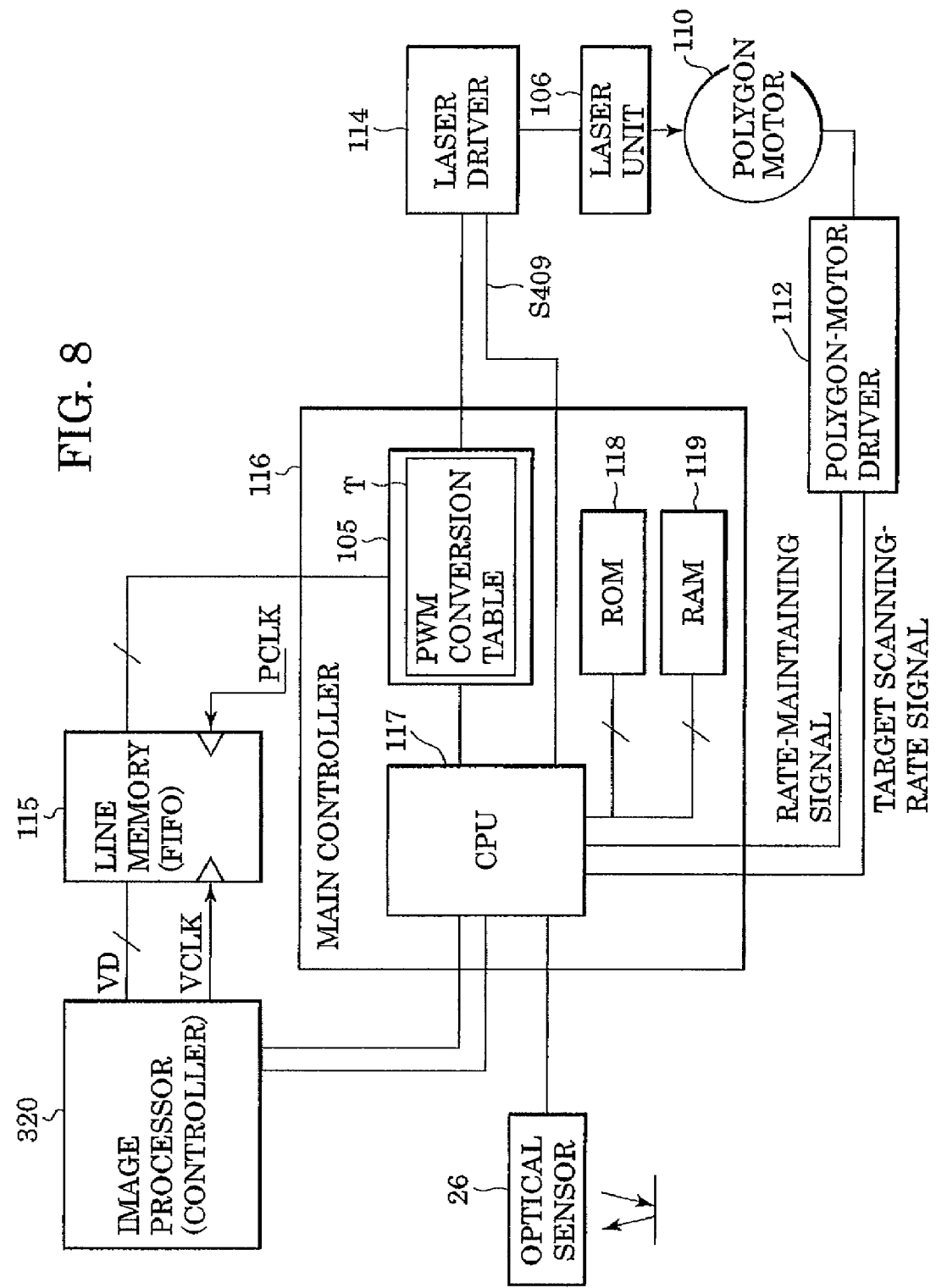
FIG. 8 is a block diagram illustrating the electrical structure of the photo-control unit according to a third embodiment.

In other words, referring to FIG. 8, according to the third embodiment, the CPU 117 in the main controller 116 sends an intensity compensation signal S409 to the laser driver 114 based on a shrinkage or expansion proportion of the transfer paper determined by the optical sensor 26. In this case, a PWM conversion table T in the PWM 105 is constant regardless of the main-scanning rate based on the shrinkage or expansion proportion of the transfer paper.

Figure 9:
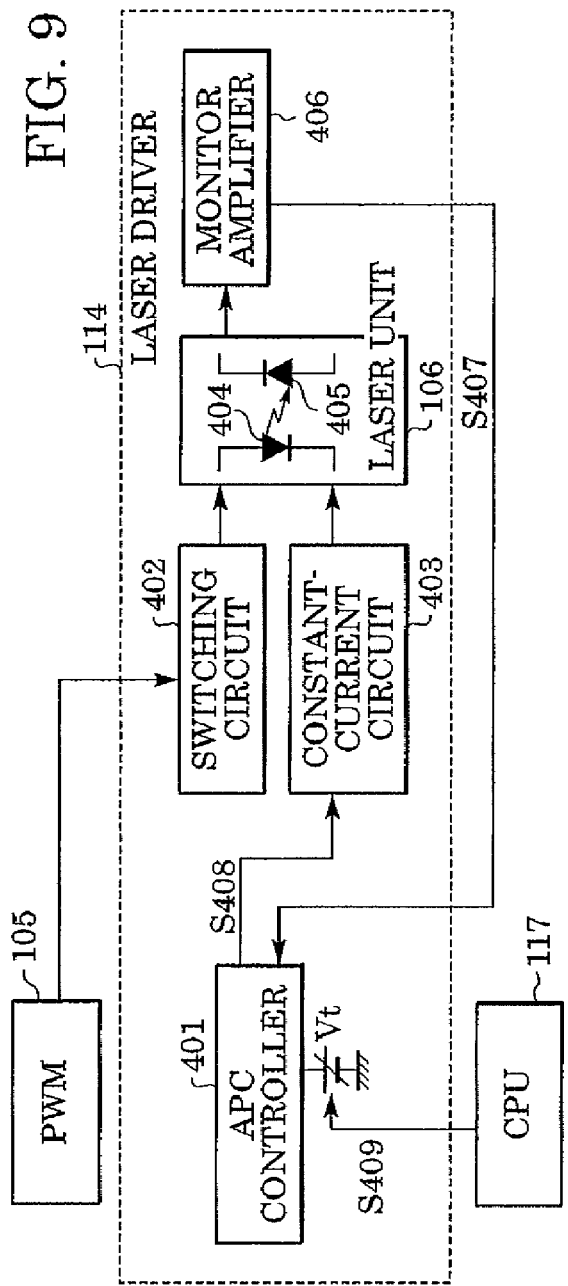
FIG. 9 is a detailed diagram illustrating the internal structure of a laser driver.

FIG. 9 illustrates the internal structure of the laser driver 114 and the laser unit 106. The laser unit 106 defining an optical scanner of laser beams includes a laser diode 404, and a photo-diode 405 disposed adjacent to the laser diode 404. Some components of a laser beam from the laser diode 404 are received by the photo-diode 405, and are amplified by a monitor amplifier 406. Thus, a signal S407 proportional to the intensity of the emitted laser beam is obtained. Subsequently, the signal S407 is compared with a laser-beam target-intensity standard signal Vt level preliminarily input in an APC (Automatic Power Control) controller 401. The APC controller 401 then sends an analog signal S408 to a constant-current circuit 403 so that the emission power of the laser diode 404 is set constant. Accordingly, after the intensity of the laser beam is set, a switching circuit 402 is turned on and off based on a PWM signal output from the PWM 105 so as to control the emission of the laser diode 404.

Figure 10A:
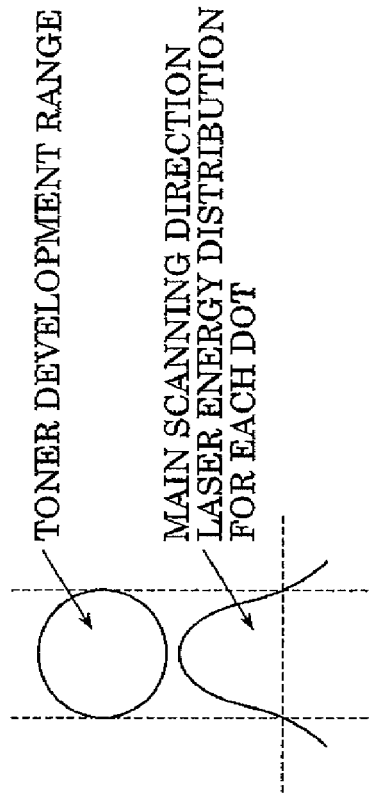
FIGS. 10A and 10B each illustrate the relationship between a toner development range and an energy distribution of an intensity of a laser beam.
Figure 10B:
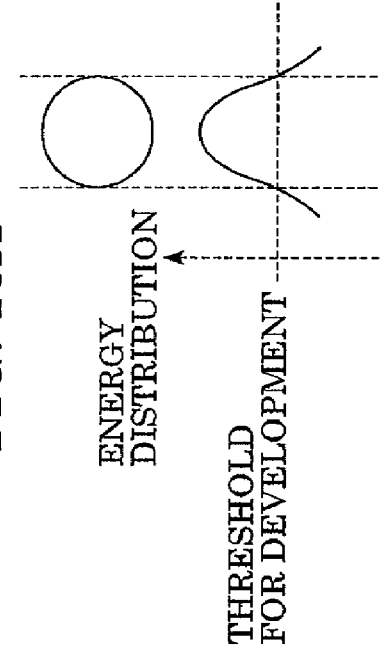

Similar to the first embodiment, based on a signal from the optical sensor 26, the CPU 117 calculates the shrinkage or expansion proportion ΔL in the main-scanning direction of transfer paper for double-sided recording or multilayer recording. Then, a main-scanning rate that compensates for a change in the lateral size of the corresponding recording image is determined. The rotational rate of the polygon motor 110 is switched so as to perform the second recording process using the determined main-scanning rate. When the rotational rate (main-scanning rate) is switched, the intensity of the laser beam per unit area on the photosensitive element becomes inconsistent even if the recording process is performed based on image data having the same density level. This may result in inconsistent density levels of the image. For example, if the main-scanning rate of the laser beam is set lower so as to prevent an image from becoming larger when the image is recorded on shrunken transfer paper, the density level of the image becomes higher. In such a case, the preliminarily-set laser-beam target-intensity standard signal Vt level corresponding to the image data having a predetermined density level is output from the CPU 117 via the intensity compensation signal S409. The laser-beam target-intensity standard signal Vt level is changed to a Vt' level so that the output intensity of the laser diode 404 is lowered. Thus, referring to FIG. 10A, the laser energy distribution (electrostatic latent image distribution) per each dot on the exposed photosensitive element 11 in the main-scanning direction becomes smaller. Consequently, the developed toner image becomes smaller with respect to a specific threshold of development. Thus, the density level of the developed image is compensated for with respect to the shrunken transfer paper so as to achieve a consistent density level in a double-sided recording or a multilayer recording. On the other hand, if the main-scanning rate of the laser beam is set higher so as to prevent an image from becoming smaller when the image is recorded on expanded transfer paper, the laser-beam target-intensity standard signal Vt level is output from the CPU 117 via the intensity compensation signal S409 such that the Vt level is changed to a Vt" level. Thus, the output intensity of the laser diode 404 is increased. Referring to FIG. 10B, the laser energy distribution (electrostatic latent image distribution) per each dot on the exposed photosensitive element 11 in the main-scanning direction becomes larger such that the developed toner image becomes larger with respect to a specific threshold of development. Thus, the density level of the developed image is compensated for with respect to the expanded transfer paper so as to achieve a consistent density level in double-sided recording or multilayer recording.

Accordingly, the third embodiment achieves substantially the same effect as the first and second embodiments by directly adjusting the intensity of the laser beam without having to change the PWM conversion table T.

Furthermore, although the optical sensor 26 of the first embodiment is used as means for calculating the shrinkage or expansion proportion of transfer paper in the third embodiment described above, the paper-type input key 5026 and the hygrothermal sensor 120 of the second embodiment may alternatively be used for calculating the shrinkage or expansion proportion.

Furthermore, the present invention is not limited to the above embodiments. For example, the present invention can be applied to a recording mode in which an image formation process including the image-fixing step on a single sheet of transfer paper is performed multiple times. Furthermore, in the first embodiment, in addition to the optical sensor 26 that detects the longitudinal size of the transfer paper, an additional optical sensor for detecting the lateral size of the transfer paper may be provided. Such an additional optical sensor may be used to determine the shrinkage or expansion proportion in the lateral direction of the transfer paper. Moreover, the positioning of such optical sensors is not limited to the upstream side of the photosensitive element 11, and may be in any location consistent with the principles and scope of the present invention.

Furthermore, by monitoring the change in the level of current flowing through a motor for driving the registration roller 25, for example, the time period in which the registration roller 25 is in contact with the transfer paper can be detected. Thus, based on this time period, the longitudinal size of the transfer paper may be determined.

Furthermore, the present invention may include a modification where a storage medium (or a recording medium)

storing software program code that achieves the functions of the above embodiments is supplied to a computer (CPU (central processing unit) and MPU (microprocessor unit)) of a system or a device, such that the computer operates by reading the program code stored in the storage medium.

In this case, the program code read from the storage medium implements the functions of the above embodiments, and therefore, the storage medium storing the program code may be included within the technical scope of the present invention. Accordingly, the program code may be operated by the computer to implement the functions of the above embodiments. Alternatively, in response to a command given by the program code, an operating system (OS) of the computer, for example, may entirely or partially perform the actual process so as to implement the functions of the above embodiments.

The present invention may further include a modification where the program code read from the storage medium is stored in a memory included in an enhancement card inserted into a computer or an enhancement unit connected to a computer. In response to a command from the program code, a CPU, for example, provided in the enhancement card or the enhancement unit performs the overall or partial process, whereby the functions of the above embodiments may be implemented. Accordingly, when the present invention is applied to such a storage medium, the storage medium stores the program code corresponding to the above-mentioned process.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image formation device which performs an image formation process on transfer paper by rotating a rotatable polygonal mirror having a plurality of reflection surfaces which reflect a laser beam from a laser source to scan an image carrier, the image formation device comprising:

a heat treating unit configured to heat-treat the transfer paper on which the image formation process is performed;

a driving unit rotatably driving the rotatable polygonal minor;

a shrinkage/expansion information obtaining unit configured to obtain shrinkage or expansion proportion of the transfer paper caused by the heat treatment; and a controlling unit configured to change the rotating speed of the driving unit and a pulse width for one pixel of image data, according to the shrinkage/expansion proportion obtained by the shrinkage/expansion information obtaining unit, when the image formation process is performed again on the transfer paper which was already heat-treated.

2. The image formation device according to claim 1, wherein the controlling unit changes the pulse width for one pixel for the image data by converting a table which shows the relation of the image data formed on the image carrier and the pulse width of the driving signal of the laser source.

3. The image formation device according to claim 1, wherein the shrinkage/expansion information obtaining unit includes a detecting unit configured to detect the size of the transfer paper and obtains the shrinkage/expansion proportion of the transfer paper based on the size of the transfer paper before and after a fixing process.

4. The image formation device according to claim 1, wherein the shrinkage/expansion information obtaining unit includes an input unit configured to input a paper quality of the transfer paper and obtains a shrinkage/expansion proportion of the transfer paper based on the paper quality input by the input unit.

* * * * *